May 20, 1930. T. T. GRAY 1,759,813
PROCESS AND APPARATUS FOR TREATING HYDROCARBONS
Filed March 24, 1925 4 Sheets-Sheet 1
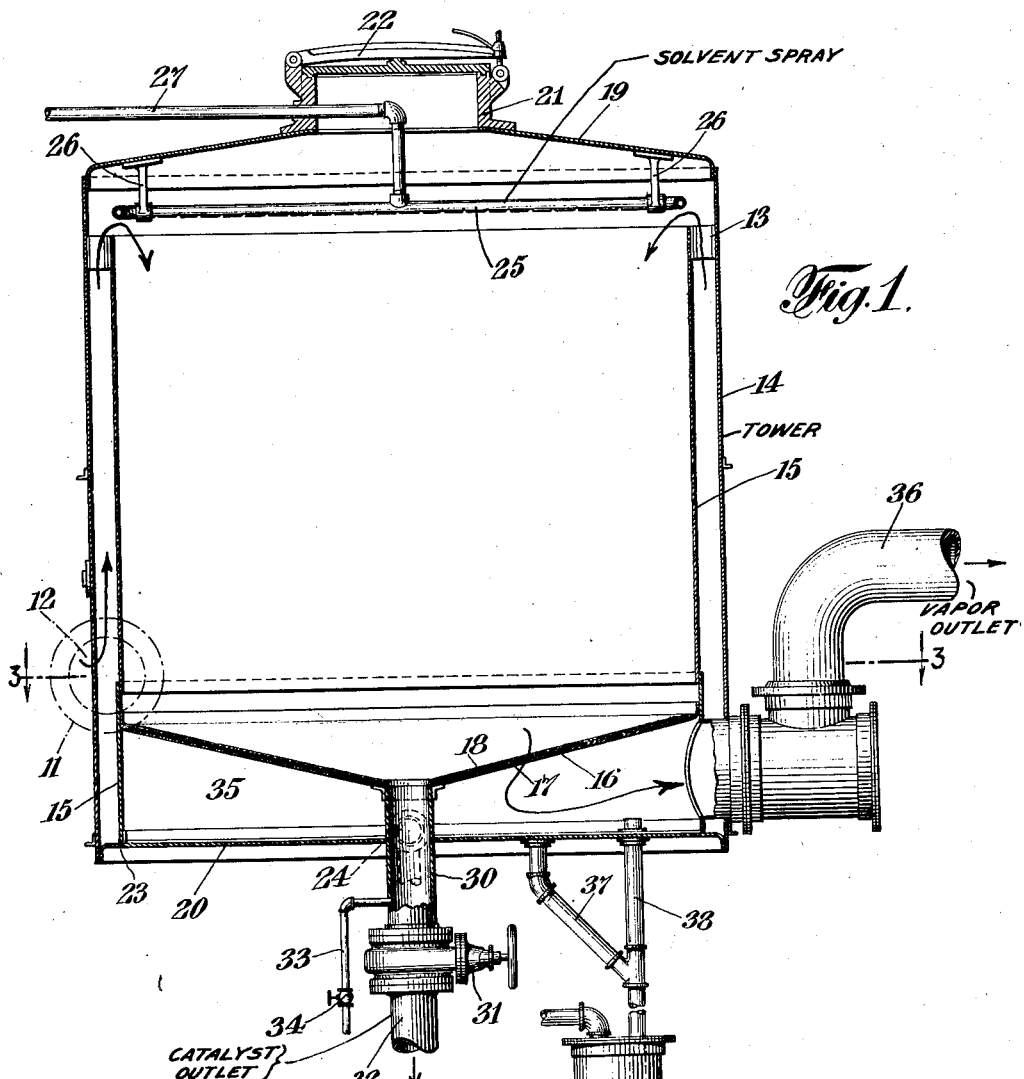
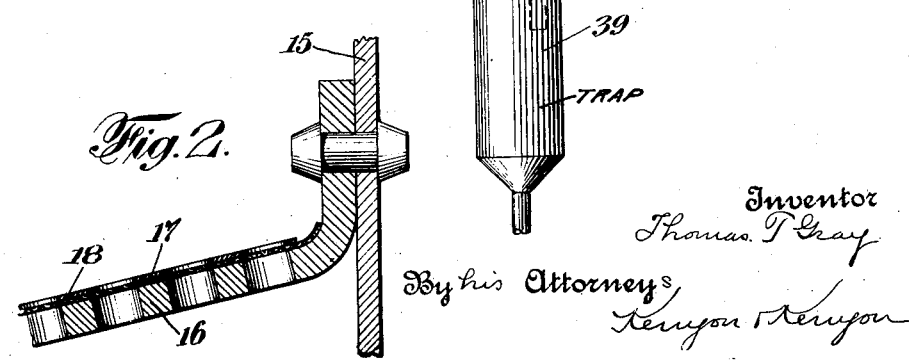

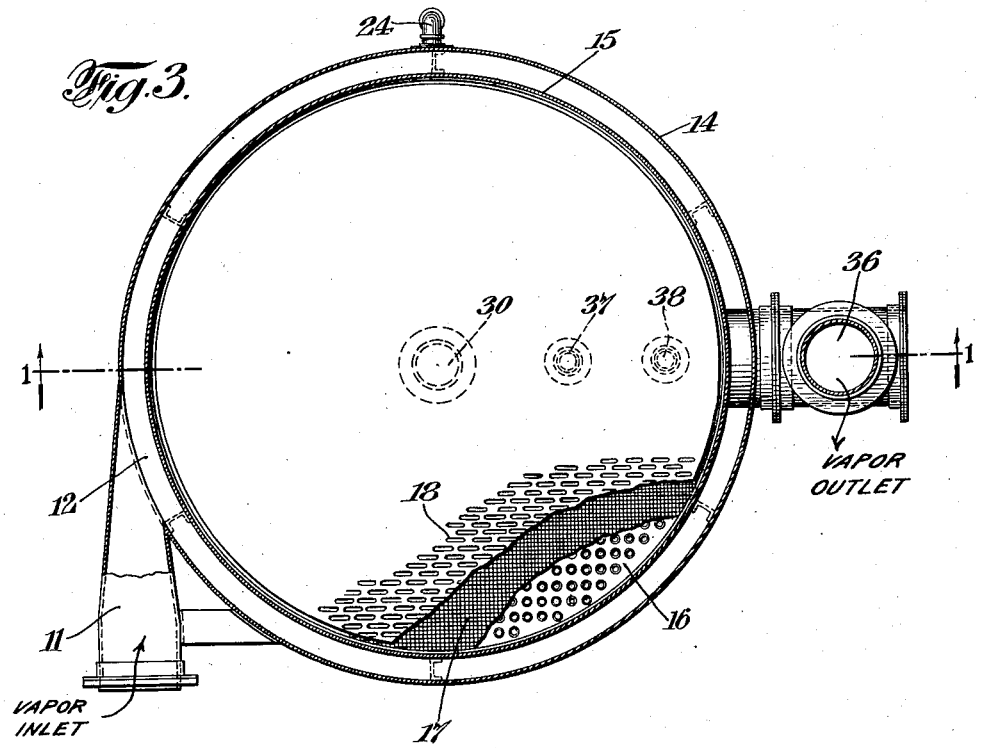
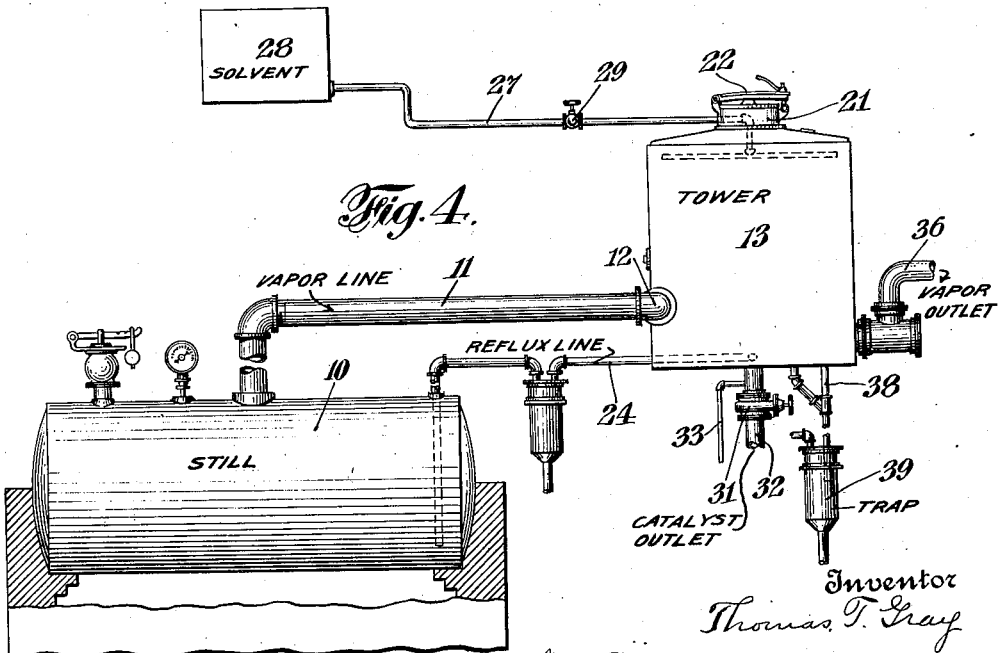

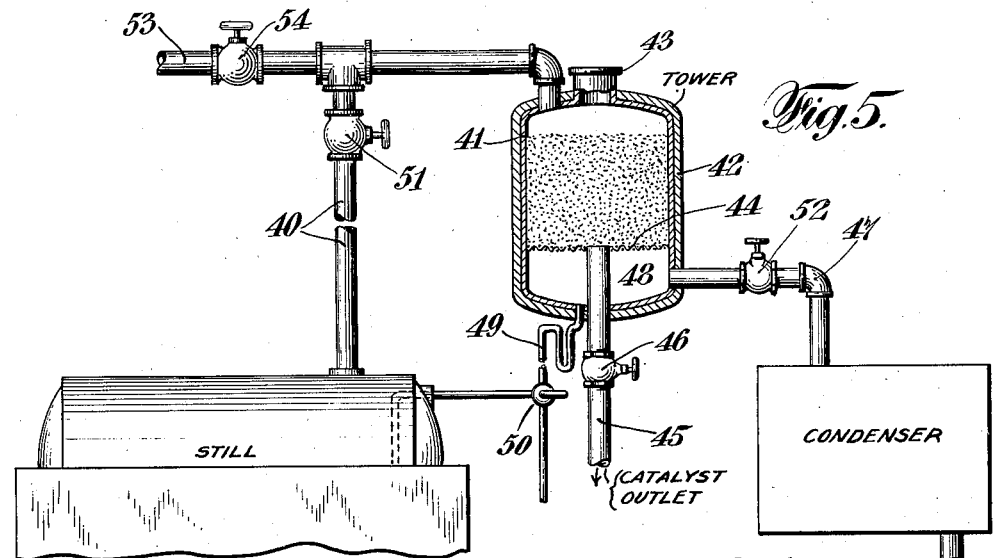
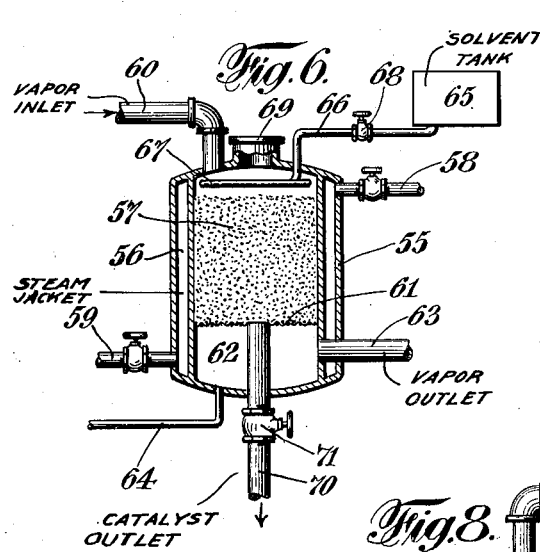
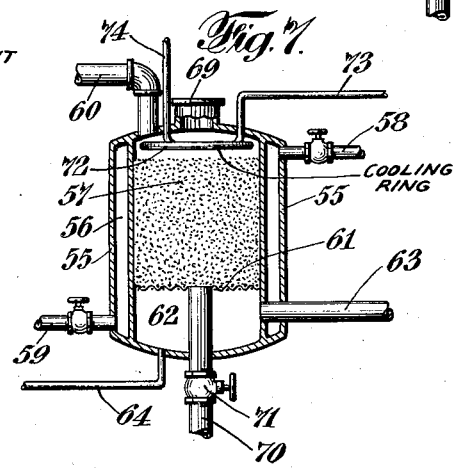
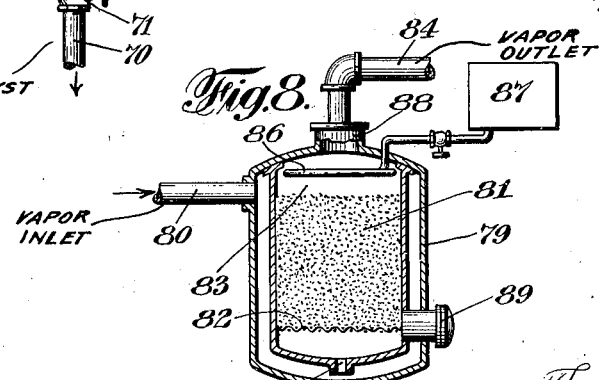

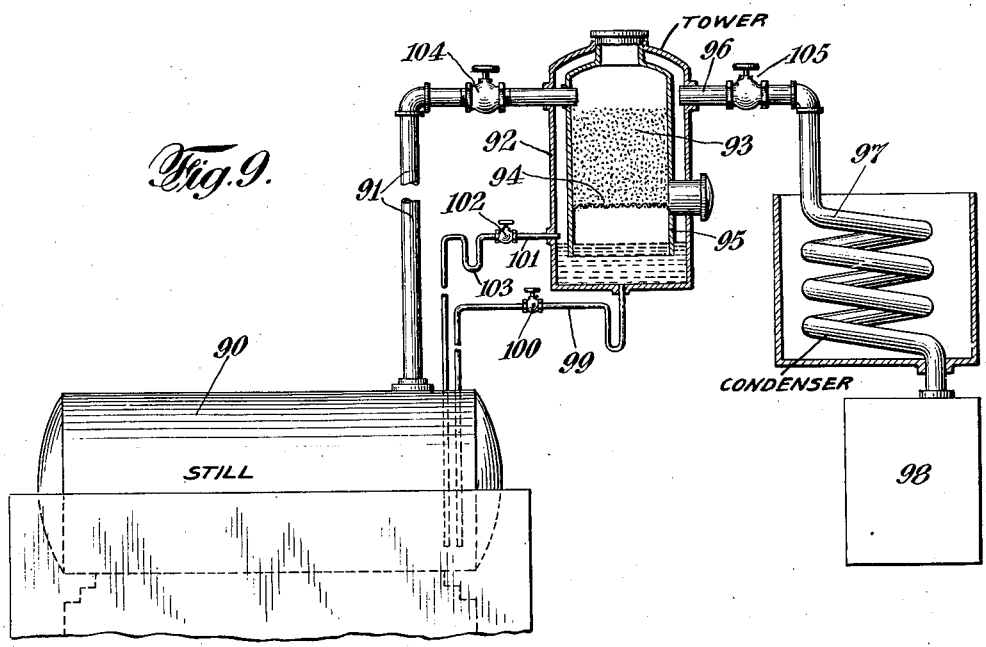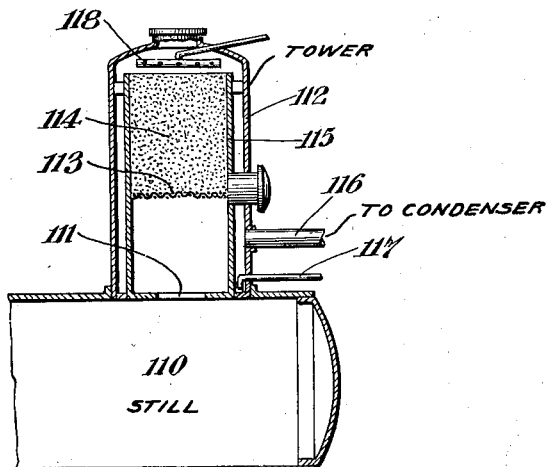

Patented May 20, 1930

1,759,813

UNITED STATES PATENT OFFICE

THOMAS T. GRAY, OF ELIZABETH, NEW JERSEY, ASSIGNOR TO GRAY PROCESSES CORPORATION, OF NEWARK, NEW JERSEY, A CORPORATION OF DELAWARE

PROCESS AND APPARATUS FOR TREATING HYDROCARBONS

Application filed March 24, 1925, Serial No. 17,855, and in Canada September 18, 1924.

This invention relates to the treatment of hydrocarbon compounds and the distillates thereof by polymerization of the unstable constituents of such compounds while in the vapor phase. It involves improvements in means for carrying on the process described in my Patent No. 1,340,889, granted May 25, 1920, and in my pending application Serial No. 664,893, filed September 26, 1923, and particularly means for improving the operation of those processes and for facilitating the removal of the spent catalyst from apparatus used therein.

It will be understood that in carrying on the said process the compounds to be purified are first vaporized and then passed in vapor form into and through a chamber containing a catalyst such as fuller's earth, boneblack, bauxite, kieselguhr, infusorial and other adsorbent earths or the like. In treating hydrocarbon compounds such as cracked distillates or so-called "cracked" gasoline, kerosene, etc., to move the unstable compounds, such as diolefine hydrocarbons and the like, it is found that with the passage of vapor through the catalyst a deposit of gum or other adhesive material forms thereon which tends to coat and adhere to the surface of the catalyst and so interfere with the catalytic action and gradually impair the effectiveness of the process, until finally the catalyst is rendered so far ineffectual as to become spent, so that it must be burned or otherwise revitalized, in order that it may be restored to condition for reuse. A manhole is ordinarily provided for charging the fresh catalyst into the top of the catalytic chamber and a gate valve for removing the spent catalyst from the bottom thereof. But difficulty has been experienced in such removal due to the fact that the foreign materials deposited during the treatment of the hydrocarbon vapors are gummy and adhesive so that the catalyst tends to stick together in masses in the catalytic chamber and to form lumps that clog the valve and prevent dumping of the catalyst when the valve is opened. It is of great importance in the practical use of the process in connection with other refinery apparatus that the time required for dumping and recharging the catalytic chamber should be cut down to a minimum in order to reduce delay and interfere as little as possible with the operation of other apparatus.

I have discovered that by introducing a solvent in small quantities into the catalytic chamber for the purpose of washing out the sticky material referred to, I am able to improve and prolong the effectiveness of the catalyst and to overcome the tendency of the catalyst to form into lumps and clog the valve. By this means, I am able to make the catalyst run freely through the gate valve when the same is opened so that the interference and delay in discharge is overcome and the same may be accomplished quickly and automatically.

Objects of my invention are to provide for carrying on the processes described in the aforementioned patent and application more economically and effectually, and to provide for rapidly discharging the catalyst from the catalytic chamber when the same has become spent, so that the apparatus may operate longer on a single charge and may be out of operation on account of discharging and recharging for the least possible time.

Other objects and advantages of the invention will be apparent from a consideration of the following description and claims, and from the accompanying drawings in which are disclosed preferred forms of apparatus for treating hydrocarbons in accordance with the invention.

In the drawings, Fig. 1 is a vertical section on line 1—1 of Fig. 3 showing one form of apparatus.

Fig. 2 is a detail of the same showing the hopper bottom, screen and protecting plate.

Fig. 3 is horizontal section of the apparatus shown in Fig. 1 taken on line 3—3 thereof.

Fig. 4 is an assembly drawing showing the apparatus operatively connected with a still and solvent tank.

Fig. 5 illustrates a modified form of apparatus for carrying on the invention, the catalytic tower being shown in vertical section. Figs. 6, 7, 8, 9 and 10 show further modifications of such apparatus.

In the apparatus shown in Figs. 1 to 4 inclusive, a still 10 of ordinary construction is shown set in brick work to be heated by fire or otherwise in the usual manner. It is connected by vapor line 11 with a port 12 in the outer jacket of a double-walled catalytic tower 13. The vapor line 11 preferably enters the tower tangentially, as shown in Fig. 3, so as to produce a circulation of hot vapors between the outer tower wall 14 and the inner chamber wall 15. Tower 13 is provided with a top 19 and a bottom 20, both of which are tightly jointed to it. In the top 19 is a manhole 21 provided with a suitable cover and locking device 22.

The inner wall 15 of the tower 13 is concentric with the outer wall 14 and forms a chamber which is open at the top and which is provided at the bottom with a perforated hopper bottom 16. A fine wire screen 17 is preferably placed over the perforated hopper bottom and a slotted plate 18 on top of the wire screen to protect the same in cleaning or in case tools are used for dislodging material collected thereon. The wall 15 is continued below the hopper bottom 16 to the tower bottom 20 and connected thereto by a tight joint as at 23. A reflux pipe 24 communicating with the tower 13 just above the bottom plate 20 is provided to convey back to the still liquids which condense between the walls 14 and 15 and which gather at the foot of the space between those walls.

Above the open upper end of the catayltic chamber 15 a circular perforated pipe 25 is supported from the tower top 19 by brackets 26. A pipe 27 connects the interior of this perforated pipe 25 with a tank 28, the flow being regulated by a valve 29.

The hopper bottom 16 of the catalytic chamber communicates by pipe 30 with a gate valve 31 and discharge pipe 32. A small drain pipe 33 may be tapped into pipe 30 just above valve 31 in order to drain out liquid accumulated therein before opening valve 31. This drain pipe is normally closed by valve 34. The space 35 between the hopper bottom 16 and the tower bottom 20 is provided with a vapor outlet 36 and one or more liquid outlets 37 and 38 communicating with trap 39.

The operation of the apparatus is as follows: The catalytic chamber within the inner walls 15 of tower 13 is filled with suitable catalytic material such as any one of the materials above mentioned or the like. I preferably use fuller's earth because it is effective in operation and is already available at many refineries for use in connection with other operations. The catalyst is charged into the tower through manhole 21 which is then tightly closed. Valves 31, 34 and 29 are closed. A deep bed of catalytic material is thus formed above the perforated bottom 16, the wire screen 17 being of sufficiently fine mesh to prevent any of the catalyst dropping through into space 35. Vapors are now admitted from still 10 through pipe 11 into the outer jacket of the tower 13 surrounding the catalytic chamber. The vapors tend to heat the catalyst in their passage around it before coming into contact with it. Such vapors as are condensed in the jacket flow to the foot thereof and are carried back to the still by pipe 24. The vapors which pass over the upper rim of wall 15 are diverted downward by top 19 and enter the body of catalytic material, pass downward through it, then through slotted plate 18, screen 17, and perforated hopper bottom 16 into space 35 from which they escape by pipe 36 into the ordinary condenser or the like not shown.

The process of polymerization of unstable hydrocarbons in the catalyst, described in my prior patent and application, results in the formation of high boiling-point liquids in the catalyst which gradually flow downward through the same into space 35 and flow out through pipe 37. The upper end of pipe 38 projects somewhat above the floor of space 35 so that in case of the collection of solid materials at the outlet into pipe 37 tending to clog the same, the liquids may find easy outlet through pipe 38. From trap 39 these liquids may be returned by appropriate means, not shown, to the still 10, or they may be separately collected.

The process likewise results in the depositing of gums and other foreign and adhesive matter in the catalytic material, so that ultimately the catalytic action is substantially interfered with thereby. To prolong the life of the catalyst, I pass a quantity of liquid material through the same capable of dissolving and removing with it a portion of the foreign matter, as well as expediting the removal of the polymers, and so keeping the surface of the catalytic material relatively clean and free to exercise its adsorptive effect on the passing vapors. Any suitable solvent may be employed. I have found that the condensate of the treated vapors is generally satisfactory for the purpose. Accordingly, during the operation of the apparatus I preferably open valve 29 somewhat to permit a small flow of solvent from tank 28 through perforated pipe 25 into the catalytic chamber. The solvent dissolves the foreign matter referred to, or a substantial part thereof, and conveys it in liquid form together with the polymers through plate 16, space 35, pipe 37 or 38 into trap 39. There is thus carried out through trap 39, the polymers or high-boiling liquids referred to which have been formed in the presence of the catalyst, condensate of vapors condensed in the catalytic chamber, and the solvent containing gums or other foreign matter as stated. The mixture may be returned to the still for redistillation, or it may be separately treated for the purpose of recovering the solvent and separating the condensed vapors from the polymers, etc.

In the form of apparatus shown in Fig. 5, the catalyst is not pre-heated by the vapors and is heated only by the direct contact of the vapors with the catalytic material. It has been found that a sufficient quantity of vapor is condensed in this manner to act as a solvent to remove the foregn matter, gum or the like which is deposited by the vapors during the process. The vapors pass from the still through pipe 40 into the top of the tower 41. The tower may be surrounded by a layer of insulating material 42 to prevent excessive condensation and to aid in keeping the catalyst at the proper temperature for washing and catalytic action. A manhole 43 is provided at the top of the tower, a screen 44 spaced above the bottom of the tower to support a catalytic material, a discharge pipe 45 and valve 46 to control the discharge of catalytic material, a vapor pipe 47 communicating with the space 48 between screen 44 and the bottom of the tower, and liquid outlet 49 for draining polymers and other liquids which may collect in the space 48. A valve 50 is provided in pipe 49 to control the return of these liquids to the still or to such other tank or apparatus as it may be desirable to collect them in. It is understood that suitable traps are to be provided where necessary to prevent reversal of flow or short circuiting in any part of the apparatus such as the passage of vapors from the still to the tower through pipe 49, etc.

In this form of apparatus the temperature of the catalyst is such as to permit the passage of part of the vapors through the tower to pipe 47 in vapor form. The higher boiling ends of the vapor product are however condensed in the catalyst and serve as a solvent to wash out the gums and the like. Indeed, it may be desirable in the case of certain hydrocarbons and certain catalysts to have a substantial part, or even a major part, of the hydrocarbons in the form of liquids in passing through the catalyst. Thus the deposit which would otherwise tend to coat the surface of the cataylst and interfere with the catalytic action which is essential to the process, is largely prevented or at least its formation delayed so that the life of the catalyst is substantially prolonged. And furthermore, when the catalyst is spent the tendency of the catalyst to cake and clog the discharge valve 46 is overcome so that the discharge of the catalytic chamber is substantially facilitated.

I provide valves 51 and 52 in pipes 40 and 47 respectively so that by leaving valve 51 open and partially closing valve 52 I may pass the vapors through the tower 41 under pressure and thus at superheated temperature, or by opening valve 52 and partially closing valve 51 I may create pressure in the still and expand the gases immediately before their passage through the tower. Thus by relative adjustment of these valves, the pressure of the vapors entering the tower may be controlled and the amount of condensation of vapors in the catalytic chamber regulated. The insulated tower walls tend to maintain these temperatures constant and to prevent interference through changes in external temperature.

I also show steam pipe 53 entering vapor pipe 40 and controlled by valve 54. I have discovered that the admission of steam to the catalytic chamber tends to prolong the life of the catalyst, probably by assisting in the removal of polymers, gums, etc., and thereby activating the adsorbent material. The steam may be admitted with the vapors or it may be admitted intermittently between the runs of successive batches of material from the still to scrub the catalyst and wash out the materials deposited therein. In such latter use, I have found dry steam at a temperature of about 400° F. to be effective.

In Fig. 6 the catalytic tower 55 is provided with a steam jacket 56 between the inner and outer walls thereof for the purpose of maintaining the catalyst in the chamber 57 at any desired temperature, and steam inlet pipe 58 and outlet pipe 59 are provided with valves for the purpose of controlling this heat. The vapors are admitted directly to the catalytic chamber through vapor line 60 and pass through the catalyst and supporting screen 61 to the separating space 62 from which the vapors pass by pipe 63 to condenser (not shown) and the liquids, including polymers, condensed vapors, solvent, etc., flow out through drain pipe 64. A solvent tank 65 is connected through pipe 66 with a spraying coil 67, the flow of solvent being controlled by valve 68. A manhole 69 is provided for charging the catalyst into the chamber 57 and discharge pipe 70, controlled by gate valve 71, is provided for discharging the same. Obviously any other suitable means may be provided for introducing the solvent into the catalyst. The solvent may be introduced continuously during the operation of the process, or it may be introduced in increasing amounts as the catalyst becomes spent, or it may be introduced solely at the end of the operation to condition the catalyst for discharge.

A modification of this apparatus is shown in Fig. 7, wherein corresponding parts are indicated by like reference numerals. In place of the solvent tank 65 and coil 67, however, I have illustrated a cooling coil 72 connected with inlet pipe 73 and outlet pipe 74. Any suitable means may be provided for supplying cooling fluid to pipe 73 and coil 72. The effect of this combination is to cause condensation of a portion of the entering vapors on account of the cooling effect of pipe 72, the vapors thereby condensed passing in liquid form through the catalyst 57 and acting as a solvent to remove gums or other foreign matters and so prolong the life of the catalyst and facilitate the discharge thereof, as above described.

A somewhat different form of apparatus is shown in Fig. 8. Here the vapors enter the tower 79 by pipe 80 and pass downward between the inner and outer walls, thereby heating the catalyst 81 within the inner chamber. An opening 85 at the bottom of the inner chamber permits the vapors to enter the inner chamber, through which they pass upward through supporting screen 82 and the body of the catalystic material 81 into space 83, thence to a condenser (not shown) by vapor outlet pipe 84. A spraying ring 86 is provided in space 83 and is fed from solvent tank 87. The catalyst is adapted to be charged into the chamber through manhole 88 and removed therefrom through manhole 89. A drain pipe 90 at the bottom of the tower below opening 85 forms an outlet for the liquids in the tower 79. These liquids consist of condensate formed in the jacket between the inner and outer walls of the tower, the solvent which has flowed downward through the catalyst and opening 85, and also the polymers formed in the catalyst. In this construction, the liquid solvent draining through the catalyst serves the double purpose of removing the gums and polymers and also of scrubbing the vapors so that much closer fractionation may be obtained. It will be apparent that the advantage of passing the vapors upwardly through the catalyst may be employed in connection with the different forms of tower illustrated in the other figures by reversing the connections of the vapor inlet and outlet pipes. The invention is not limited to any particular direction of flow of the vapors in passing through the catalyst and accordingly that matter can be varied according to the requirements of the individual case.

In Fig. 9, I show a somewhat different form of apparatus in which the vapors pass first through the catalyst then through a scrubbing liquid, then around the catalyst and thence to the condenser. The still 90 is connected by vapor pipe 91 to the double walled tower 92. The vapor pipe 91 penetrates both walls and admits the vapor directly into the presence of the catalyst 93 through which is flows downward, then through supporting screen 94, around the open lower end of inner wall 95, upward around the inner chamber to vapor outlet pipe 96 and so to condenser 97 and receiving tank 98. Pipe 99 connects the bottom of the tower with the still and is normally closed by valve 100. Pipe 101 is connected into the side of tower 92 above the lower end of inner wall 95 to convey liquids which may rise to that point in the tower back into the still. Pipe 101 is provided with a valve 102 and trap 103. Valves 104 and 105 may be placed in pipes 91 and 96 respectively if desired. Means are provided for charging and discharging the catalyst as in forms of the invention previously discussed.

This form of apparatus operates as follows: The vapors entering the catalyst directly are partially condensed therein so that a liquid seal of condensed vapors, polymers, etc., is formed around the lower end of wall 95 as shown. The uncondensed vapors pass through the liquid and upwardly in the jacket between the inner and outer walls of the tower, their heat tending to maintain or increase the temperature of the catalyst and to insulate the catalytic chamber. The valves 104 and 105 may be employed to regulate the pressure and temperature of the vapors passing through the tower as above described. Pipe 99 is employed to drain the tower when desired.

In Fig. 10, I show a simpler form of apparatus wherein the tower is mounted directly on the still. The inner chamber of the tower may be arranged to receive the vapors either before or after the vapors pass through the surrounding jacket. In the form illustrated, the vapors pass from still 110 through vapor outlet 111 into the inner chamber of double walled tower 112, then upward through supporting screen 113, catalyst 114, over the upper rim of the inner wall 115 and downward through the jacket surrounding the catalytic chamber. Vapors are carried from the jacket to a condenser (not shown) by pipe 116. Liquids collecting in the foot of the jacket are withdrawn by pipe 117 and may be separately collected or returned by appropriate means to the still 110. A spray coil 118 is preferably mounted in the top of the tower whereby solvent may be introduced into the catalyst. The solvent, polymers, gums and other liquids formed in the catalyst flow through the screen 113 into the still.

From the foregoing description and illustration of the invention it is obvious that many changes and modifications may be made in the form of apparatus and relation of parts without departing from the invention as set forth in the appended claims.

What I claim as new and desire to secure by Letters Patent of the United States is:

1. The process of purifying cracked hydrocarbons which consists in passing the same in vapor form through a body of solid adsorbent material thereby depositing on the said material a polymerized compound which tends by its presence to render the said material ineffectual and then removing the said compound by passing a liquid solvent thereof through the said material.

2. The process of purifying cracked hydrocarbons which consists in passing the same in vapor form through a body of solid adsorbent material thereby depositing on the said material a polymerized compound which tends by its presence to render the said material ineffectual and removing the said compound during operation of the process by passage of a condensate of the said vapors through the said material.

3. The process of purifying cracked hydrocarbons which consists in passing the same in vapor form through a body of solid adsorbent material thereby depositing on the said material a polymerized compound which tends by its presence to render the said material ineffectual and revitalizing the said material without interruption of the process by passing therethrough a liquid solvent of the said compound.

4. The process of purifying cracked hydrocarbons which consists in passing the same in vapor form through a body of solid adsorbent material thereby depositing on the said material a polymerized compound which tends by its presence to render the said material ineffectual, condensing a portion of the vapors in the presence of the said deposited compound to form a liquid capable of dissolving the same and passing the said liquid through the said material thereby continuously washing out the said deposited compound and revitalizing the said material.

5. The process of purifying cracked hydrocarbons which consists in passing the same in vapor form through a solid adsorbent material thereby forming and depositing in the said material certain high boiling hydrocarbon compounds and then condensing a portion of the vapors to thereby wash the said compounds out of the said material and prolong the effective life thereof.

6. The process of purifying cracked hydrocarbons which consists in passing the same in vapor form through a solid adsorbent material thereby forming in the said material certain high boiling hydrocarbon compounds which tend by their presence to render the said material gummy and adhesive and then passing a liquid capable of substantially removing the said compounds through the said material.

7. The process of purifying cracked hydrocarbons which consists in passing the same in vapor form through a solid adsorbent material thereby forming in said material polymerized compounds, maintaining the temperature of the said material above the condensation point of the desired vapors and below that of the said compounds and continuously removing the said compounds by the passage of a liquid solvent thereof through the said material.

8. The process of purifying cracked hydrocarbons which consists in passing the same in vapor form through a body of solid adsorbent material thereby forming in the said hydrocarbons certain high boiling polymerized compounds, maintaining the said material at a temperature such as to produce condensation of a portion of the entering vapors, passing the condensate through the said material to thereby substantially remove the said compounds and separating the vapors and liquids emerging from the said material.

9. The process of purifying cracked hydrocarbons which consists in passing the same in vapor form into contact with a body of solid adsorbent material thereby depositing a polymerized compound on the said material, regulating the pressure of the said vapors in the presence of the said material in such manner as to produce condensation of a portion thereof and passing the condensate through the said material to substantially remove the said compound and revitalize the said material without interruption of the process.

10. The process of purifying cracked hydrocarbons which consists in passing the same in vapor form through solid adsorbent material thereby forming in the said material polymerized compounds, passing a liquid capable of activating the said material therethrough without interruption of the process and continuously separating the vapors from the liquid emerging from said material.

11. The process of purifying cracked hydrocarbons which consists in passing vapors thereof into contact with a solid adsorbent material to induce polymerization of unsaturated constituents thereof and coincidently passing a liquid solvent of the polymers through such material.

12. The process of purifying cracked hydrocarbons which consists in passing the same partly in liquid and partly in vapor form into contact with a solid adsorbent material to form polymers from unsaturated constituents of such hydrocarbons and continuously dissolving the polymers in and removing them from the said material with the liquid portion of the said hydrocarbons.

13. The process of treating hydrocarbon oils for the removal of unsaturated compounds which comprises passing the oil vapors thru solid adsorbent catalytic material to effect polymerization of said unsaturated compounds, and simultaneously washing therefrom polymerized compounds by means of a solvent.

14. The process of treating hydrocarbon oils for the removal of unsaturated compounds which comprises passing the oil vapors thru solid adsorbent catalytic material to effect polymerization, and simultaneously washing therefrom adsorbed polymerized compounds by means of a solvent, the process being carried on under superatmospheric pressure.

15. The process of treating hydrocarbon oils to effect partial separation therefrom of unsaturated compounds of substantially the same boiling point which comprises polymerizing the unsaturated compounds to compounds of higher boiling point by passing the oil in vapor form thru a solid catalytic material and simultaneously washing high boiling polymers from the catalytic material by means of a solvent.

16. The process of continuously maintaining the activity of a solid adsorbent material used in polymerizing unsaturated compounds contained in hydrocarbon oil vapors which comprises washing therefrom adsorbed polymers by means of a liquid solvent, simultaneously with the passing of the vapors thru the adsorbent material.

17. The process of continuously maintaining the activity of a solid adsorbent material used in polymerizing unsaturated compounds contained in hydrocarbon oil vapors which comprises washing therefrom adsorbed polymers by means of a liquid solvent, simultaneously with the passing of the vapors thru the adsorbed material under superatmospheric pressure.

18. The process of treating hydrocarbon oils to effect partial separation therefrom of unsaturated compounds of substantially the same boiling point which comprises polymerizing a portion of the unsaturated compounds to form compounds of higher boiling point by continuously passing the oil in the vapor form thru a bed of adsorbent catalytic material and continuously washing therefrom adsorbed polymers by condensing and returning to the bed of catalytic material a portion of the purified vapors.

19. The process of treating hydrocarbon oils to effect separation therefrom of undesirable unsaturated compounds of substantially the same boiling point which comprises polymerizing said unsaturated compounds to form compounds of higher boiling point by continuously passing the oil in vapor form thru a solid adsorbent catalytic material under superatmospheric pressure and at such temperatures that a portion of the vapors are condensed to liquid and are passed downward through the catalytic material, dissolving therefrom adsorbed polymers and continuously maintaining the activity of the catalyst.

20. The process of treating hydrocarbon oils to effect separation therefrom of undesirable unsaturated compounds of substantially the same boiling point which comprises polymerizing said unsaturated compounds to form compounds of higher boiling point by continuously passing the oil in the vapor form thru a solid adsorbent catalytic material at such temperatures that a portion of the vapors are condensed to liquid and are passed downward through the catalytic material, dissolving therefrom adsorbed polymers and continuously maintaining the activity of the catalyst.

21. In an apparatus for purifying hydrocarbon oils, a catalyst container, a bed of solid pulverulent catalytic material positioned within the container, means for passing the oil to be treated in vapor form through the bed of catalytic material whereby a portion of the vapor constituents are polymerized and separated from the remaining purified vapors, means for conducting the purified vapors to a condenser, means for continuously supplying purified and condensed vapors to the catalyst bed, and means for withdrawing, separate from the purified vapors, the bulk of the polymers formed during the process dissolved in the liquid condensate supplied to the catalyst container.

22. In an apparatus for purifying hydrocarbon products, a catalyst container, a bed of solid pulverulent catalytic material positioned within the container, means for passing the product to be treated in vapor form through the bed of catalytic material whereby a portion of the vapor constituents are polymerized and separated from the remaining purified vapors, means for conducting the purified vapors from said container, means for continuously supplying to the catalyst bed, from the vapors, condensate lying within the boiling range of the vapors admitted to the apparatus for washing out from the catalyst deposits formed therein, and means for withdrawing, separate from the purified vapors, the bulk of the polymers formed during the process dissolved in the liquid condensate supplied to the catalyst bed.

In testimony whereof, I have signed my name to this specification.

THOMAS T. GRAY.

CERTIFICATE OF CORRECTION.

Patent No. 1,759,813.                                        Granted May 20, 1930, to

THOMAS T. GRAY.

It is hereby certified that error appears in the printed specification of the above numbered patent requiring correction as follows: Page 6, line 25, claim 17, for the word "adsorbed" read "adsorbent"; and that the said Letters Patent should be read with this correction therein that the same may conform to the record of the case in the Patent Office.

Signed and sealed this 24th day of June, A. D. 1930.

(Seal)
M. J. Moore,
Acting Commissioner of Patents.